Patented June 17, 1930

1,765,331

UNITED STATES PATENT OFFICE

JAMES H. GRAVELL, OF ELKINS PARK, PENNSYLVANIA, ASSIGNOR TO AMERICAN CHEMICAL PAINT COMPANY, OF AMBLER, PENNSYLVANIA, A CORPORATION OF DELAWARE

PREPARING METAL FOR PAINTING

Application filed May 23, 1929. Serial No. 365,575.

No Drawing.

This invention relates to preparing metal for painting and is directed to a material for that purpose.

It has been the practice to use phosphoric acid as such, for cleaning metal to be painted, as it has an advantage over other acids in that it does not cause the metal to subsequently corrode. Phosphoric acid, however, must be carefully removed from the metal before the painted finish is applied; otherwise, as experience has shown, the finish will not prove lasting and the object of the use of phosphoric acid will be defeated.

I have found the reason for this to be that phosphoric acid as such, is deliquescent and produces a moist film on the metal, which if painted over, interferes with the lasting qualities of the finish. It is, therefore, evident that when phosphoric acid as such, is used for preparing metal for painting, care, experience and judgment must be exercised in removing it if paint failures are to be guarded against.

Objects of this invention are to overcome the objections of phosphoric acid as such, to obtain the advantages of the use of phosphoric acid for preparing metal for painting without risk to the finish, to provide a cleaning material less harmful to the hands than that containing phosphoric acid as such, and to generally improve the art of cleaning metal prior to painting it.

I have discovered that if the first hydrogen atom of the phosphoric acid used in cleaning material is neutralized with an alkali, producing an acid salt of phosphoric acid, the cleaning material may be used without the danger of leaving behind a moist film on the metal, and thus the objection to the use of phosphoric acid as such, will be overcome.

To carry out my invention, I may provide a relatively strong solution of an acid salt of phosphoric acid. This may be prepared by adding sufficient alkali to a solution of phosphoric acid to just neutralize its first hydrogen atom. This solution is then used for the cleaning process, which consists in applying the solution to the metal, allowing it to act on the metal and then removing it, together with the deleterious products of its reaction, as for example, by wiping the metal with a dry rag. As soon as the metal has air dried, it is ready to receive the painted finish. If any of the cleaning material is inadvertently overlooked in the removal step of my process, no harm to the painted finish will result, as the acid salt of phosphoric acid is a dry crystal which is practically harmless to the finish.

To prepare the solution, I may use any alkali suitable for the purpose, such as sodium, potassium or ammonium. From a practical standpoint, I prefer to use ammonium, as the resultant mono-ammonium phosphate is more soluble in the solvents used in the solution, and hence, produces a greater concentration of the active ingredient.

When the metal to be cleaned is free of oil, I may simply use water for the solvent, but when the metal is covered with a film of oil, I mix a suitable oil solvent with the cleaner. Such oil solvents as ethyl alcohol, butyl alcohol, ethyl-methyl-ketone, acetone, and the like may be used to advantage, either individually or collectively. I have found that a mixture of ethyl and butyl alcohols produces satisfactory results.

To practice the invention a cleaning agent may be made by admixing:

| | Gallons |
|---|---|
| Water | .5900 |
| Ethyl alcohol (denatured) | .2000 |
| Butyl alcohol | .0500 |
| Phosphoric acid (75%) | .0500 |

This produces an acid solution of phosphoric acid which leaves a moist film on the cleaned metal. However, if to this admixture is added: ammonia water (26°) .0300 gallons, the first hydrogen atom of the phosphoric acid will be neutralized with the result that the acid in the admixture is converted into a solution of mono-ammonium phosphate, producing a solution which may be used for cleaning the metal and not have the disadvantage of a solution containing phosphoric acid as such.

It is evident from the description of the cleaner that the same result may be obtained by neutralizing the phosphoric acid with the alkali in the manner described before it is introduced into the admixture and that proportions may be altered and other ingredients substituted so long as the partially neutralized phosphoric acid is held in liquid solution and is suitable for the purpose.

When the cleaner is used according to the process it is especially useful for preparing steel automobile bodies for receiving quick drying priming coats of paint, lacquer, etc., as its removal may be quickly accomplished without recourse to washing it with running water, as a simple wiping operation sufficiently removes it.

I claim:

1. The method of preparing metal for painting comprising treating the metal with an aqueous solution of acid salt of phosphoric acid in which one hydrogen atom of the acid is replaced by basic elements or radicals, permitting the solution to act on the metal, and then removing the solution together with the deleterious products of the reaction.

2. The method of preparing metal for painting comprising treating the metal with an aqueous solution of acid salt of phosphoric acid in which one hydrogen atom of the acid is replaced by basic elements or radicals, permitting the solution to act on the metal, and then dry cleaning the surface to remove the solution together with the deleterious products of the reaction.

3. The method of preparing metal for painting consisting in treating it with an aqueous solution of mono-ammonium phosphate, permitting it to act on the metal and then removing the said solution together with the deleterious products of its reaction.

4. A material for preparing metal for painting being an aqueous solution comprising an admixture of an oil solvent, water, and acid salts of phosphoric acid in which one hydrogen atom of the acid is replaced by basic elements or radicals.

5. A material for preparing metal for painting being a liquid solution comprising an admixture of alcohol, water, and acid salts of phosphoric acid in which one hydrogen atom of the acid is replaced by basic elements or radicals.

6. A material for preparing metal for painting being a liquid solution comprising an admixture of an oil solvent, water and ionized mono-ammonium phosphate.

7. A material for preparing metal for painting being a liquid solution comprising an admixture of alcohol, water and ionized mono-ammonium phosphate.

JAMES H. GRAVELL.